United States Patent [19]
Belart

[11] 4,242,867
[45] Jan. 6, 1981

[54] STANDBY SUPPLY SYSTEM FOR DELIVERING PRESSURE FLUID TO A USER COMPONENT

[75] Inventor: Juan Belart, Walldorf, Fed. Rep. of Germany

[73] Assignee: ITT Industries, Inc., New York, N.Y.

[21] Appl. No.: 19,951

[22] Filed: Mar. 12, 1979

[30] Foreign Application Priority Data

Apr. 1, 1978 [DE] Fed. Rep. of Germany ....... 2814163

[51] Int. Cl.³ .............................................. F16K 11/03
[52] U.S. Cl. ................................. 60/405; 137/110; 60/413; 60/547 A; 91/5; 91/28
[58] Field of Search ................ 137/110, 102, 107; 60/405, 413, 547 A; 91/28, 32, 33, 5; 303/10

[56] References Cited

U.S. PATENT DOCUMENTS

| 3,225,544 | 12/1965 | Lemley | 91/28 |
| 3,882,678 | 5/1975 | Fassbender | 60/405 |
| 4,041,990 | 8/1977 | Tang et al. | 60/405 |
| 4,075,848 | 2/1978 | Ueda | 60/547 A |
| 4,145,886 | 3/1979 | Haigh | 91/33 |
| 4,149,379 | 4/1979 | Shimizu | 60/413 |
| 4,161,867 | 7/1979 | Adachi | 60/405 |

FOREIGN PATENT DOCUMENTS 2043963 3/1971 Fed. Rep. of Germany .
2426566 12/1974 Fed. Rep. of Germany .

Primary Examiner—William R. Cline
Assistant Examiner—H. Jay Spiegel
Attorney, Agent, or Firm—John T. O'Halloran; Alfred C. Hill

[57] ABSTRACT

The standby supply for delivering pressure fluid to a user component includes a fluid pump as a primary fluid source coupled to the user component by a first check valve, an accumulator as a secondary fluid source coupled to the pump by a second check valve for charging the accumulator and a valve arrangement coupled to the pump, the accumulator and the user component responsive to pressure from the pump to control a connection from the accumulator to the user component.

6 Claims, 2 Drawing Figures

4,242,867

STANDBY SUPPLY SYSTEM FOR DELIVERING PRESSURE FLUID TO A USER COMPONENT

BACKGROUND OF THE INVENTION

The present invention relates to a standby supply system for delivering pressure fluid to a user component, in particular a hydraulic brake booster, with a primary fluid source adapted to be connected to the user component through a valve arrangement, and with a secondary fluid source adapted to be connected to the user component through the valve arrangement in the event of failure of the primary fluid source.

Such a standby supply system is known from German Printed Application DE-OS No. 2,043,963 in which both fluid sources are pumps. In the normal operating state, the primary pump delivers fluid to the user component through a supply line while the fluid delivered by the secondary pump is passed to the unpressurized reservoir. If the delivered fluid volume drops or the primary pump fails, the secondary pump is connected to the supply line which communicates with the user component, supplying the user component with pressure fluid.

This standby supply system serves to provide continued flow of fluid, corresponding to the delivery of the primary pump, to the user component in the event of failure of the primary pump. This makes it necessary to provide a secondary fluid source which is just as costly as the primary fluid source. Thus, two pumps and two pump drives are required.

SUMMARY OF THE INVENTION

An object of the present invention is to provide a standby supply system which ensures continued fluid supply to the user component by simple means in the event of failure of the primary fluid source.

Standby supply system of the present invention is suitable particularly for hydraulic systems, such as hydraulic brake boosters and power steering systems, which operate according to the open-center principle and requires no high amounts of fluid for actuation.

A feature of the present invention is the provision of a standby supply system for delivering pressure fluid to a user component comprising: a primary fluid source; a first check valve coupling the pressure fluid of the primary source to the user component; an accumulator; a second check valve coupling the pressure fluid of the primary source to the accumulator for charging thereof; and a valve arrangement coupled to the primary source, the accumulator and the user component, the valve arrangement being responsive to pressure from the primary source to control a connection from the accumulator to the user component.

From German Printed Application DE-OS No. 2,426,566 a pressure fluid system is known wherein a pump delivers fluid to several user components through an accumulator and a valve, the valve being arranged to operate in the event of a partial or total failure of the pump and supplying fluid to only the most important user component, for example, a brake system. However, since fluid delivery of the pump is always through the accumulator, in the case of open-center systems operating at a very low pressure, the pressure in the accumulator adjusts itself to the instantaneous delivery pressure of the pump. If the pump fails at a moment at which the delivery pressure happens to be low, this low pressure is not sufficient to be used effectively, for example, for brake boosting during subsequent braking. Accordingly, the fluid system according to DE-OS No. 2,426,566 has no effective standby supply system.

In an advantageous embodiment, the valve arrangement of this invention has a valve housing with a bore accommodating a piston slidable therein in an axial direction, with the front surface at the one end of the piston being exposed to the pressure from the primary fluid source, while the other piston end, which projects into an outlet chamber connected to the user component, is adapted to isolate a passageway connecting the outlet chamber with the accumulator. It is a particular advantage in this arrangement if the end of the passageway close to the outlet chamber is designed as a valve seat and the end of the piston projecting into the outlet chamber is designed as a mating closure member.

If the bore in the housing is a stepped bore and the piston is a stepped piston having its large step directed towards the inlet chamber, a transmission ratio is obtained resulting in the valve, which opens the connection from the accumulator to the user component, being kept closed by the low pressure of the open-center pump even in the presence of a high accumulator pressure.

In order to have a defined position of the piston when the system is unpressurized, the piston may be acted upon by a low spring force in the direction opening the passageway.

A simple ducting in the valve arrangement is achieved by providing for connection of the inlet chamber with the outlet chamber through the second check valve, and of the outlet chamber with the accumulator through the first check valve. It is particularly space-saving herein if the connection between the inlet chamber and the outlet chamber is a channel formed axially within the piston and having its one end opening into the inlet chamber axially and its other end into the outlet chamber radially.

The structure of the valve arrangement is simplified still further by providing the passageway in a valve plate forming the closure member of the first check valve, which valve plate, with its outer edge area, is kept in abutment with a valve seat by the force of a spring and isolates the outlet chamber from a pressure chamber connected to the accumulator. It is an advantage in this arrangement if the valve passageway of the first check valve which directs flow from the outlet chamber to the accumulator, has a large cross-sectional area. This permits rapid charging of the accumulator.

Ease of manufacture of the housing and the individual valve parts is achieved by providing for concentric arrangement of all valves of the valve arrangement in the valve housing. This makes it possible for all valve parts and the housing to be produced by turning which is a simple manufacturing method.

In order to avoid that in the normal open-center mode of the system the low delivery pressure then prevailing displaces the piston such that it lifts the valve plate off its seat, thereby allowing discharging of the accumulator, the force of the spring bearing upon the valve plate in the closing direction is preferably greater than the force, acting upon the large step, of the pressure prevailing in the inlet chamber as a result of the resistance of the second check valve.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
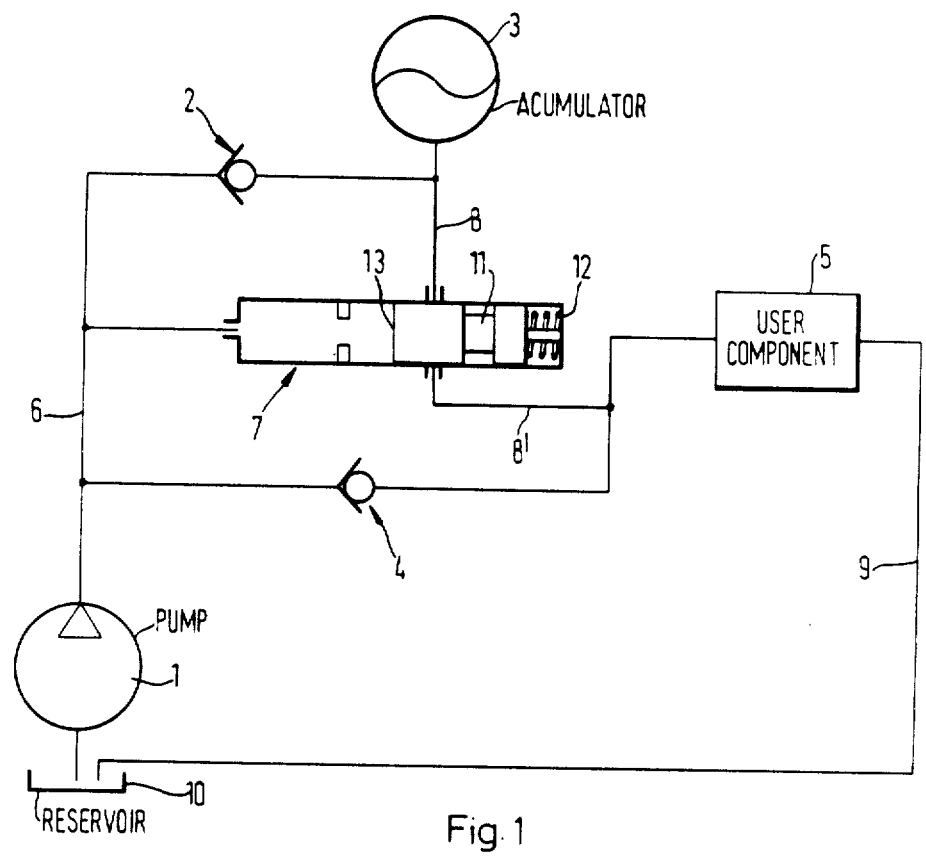
FIG. 1 is a schematic view of a standby supply system according to the principles of the present invention.

The standby supply system of FIG. 1 includes a pump 1 whose pressure pipe 6 is connected to an accumulator 3 through a first check valve 2 and to a user component 5 through a second check valve 4. Further, pressure pipe 6 is in communication with a valve 7 adapted to control lines 8 and 8' leading from accumulator 3 to user component 5. A return pipe 9 leads from user component 5 to an unpressurized reservoir 10.

This hydraulic system operates according to the open-center principle. This means that in the inoperative state of user component 5 pump 1 delivers fluid only at a pressure caused by the flow resistance of the units through which fluid is being fed. In this system, pump 1 delivers fluid through second check valve 4 and open-center user component 5 as well as through return pipe 9 to reservoir 10. The valve member 11 of valve 7 is held in its right-hand position as a result of the pressure acting on its effective area 13 in opposition to the low force of spring 12, thus, shutting off the passage from accumulator 3 through lines 8 and 8' to user component 5.

If user component 5 is actuated, which results in an increase in the flow resistance in user component 5, pump 1 delivers fluid at a pressure corresponding to the increased flow resistance. If this pressure is higher than the pressure in accumulator 3, the latter is charged through first check valve 2. Valve 7 remains in its position in which it isolates accumulator 3 from user component 5.

In the event of failure of pump 1, effective area 13 of valve 7 has no pressure applied thereto and spring 12 shifts valve member 11 into its left-hand position in which position valve member 11 opens the passage of flow from line 8 to line 8' so that the fluid contained in accumulator 3 is made available to user component 5.

Figure 2:
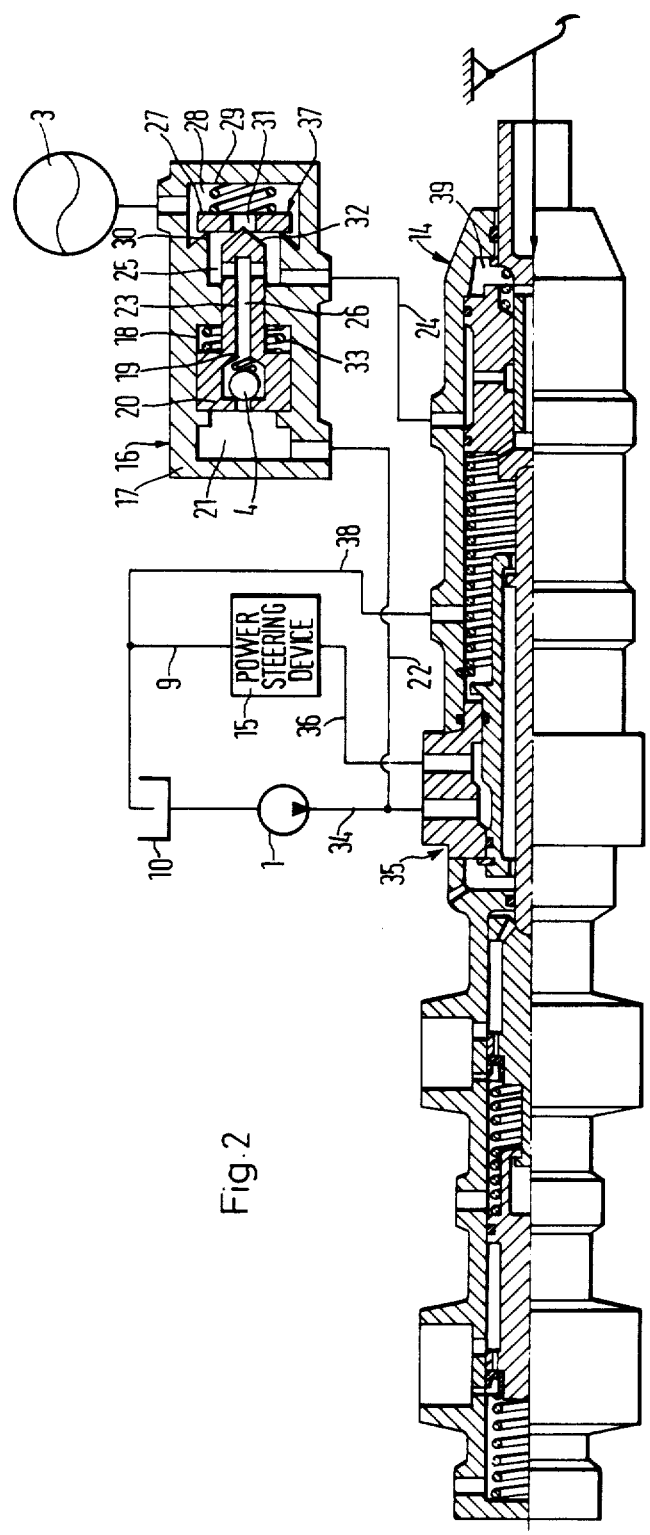
FIG. 2 is a partial cross-sectional view of a standby supply system according to the principles of the present invention providing pressure fluid to a hydraulic brake booster.

FIG. 2 shows a hydraulic system with a hydraulic brake booster 14 and a power steering device 15 which are supplied with pressure fluid by pump 1 according to the open-center principle. In this arrangement, the supply of fluid to brake booster 14 is given priority over power steering device 15. Fluid is delivered to brake booster 14 through a valve arrangement 16 serving at the same time as a standby supply system in the event of a failure of pump 1. The valve arrangement 16 includes a valve housing 17 with a stepped bore 18 accommodating slidably therein a stepped piston 19. The large step 20 of stepped piston 19 forms a boundary for the leftward end of stepped bore 18, forming in this end an inlet chamber 21 connected to pump 1 through a pipe 22. The end of small step 23 of stepped piston 19 extends into an outlet chamber 25 which is connected to brake booster 14 through a pipe 24. A channel 26 formed in stepped piston 19 connects inlet chamber 21 with outlet chamber 25, with check valve 4 being disposed in channel 26 preventing return of fluid from brake booster 14 to pump 1.

A valve plate 27 isolates outlet chamber 25 from a pressure chamber 28 which is connected to accumulator 3. The outer edge area of valve plate 27 is held in abutment with an annular valve seat 30 by a spring 29.

Further, valve plate 27 includes a passageway 31 which connects outlet chamber 25 with pressure chamber 28. The end of passageway 31 adjacent to outlet chamber 25 is formed as a valve seat and the end of small step 23 of stepped piston 19 is formed as a closure member 32. Thus, the connection between outlet chamber 25 and pressure chamber 28 can be controlled.

A low-force spring 33 bearing against the step of bore 18 and the step of stepped piston 19 acts upon stepped piston 19 in a direction opening passageway 31.

The operation of the hydraulic system illustrated in FIG. 2 is as follows:

In the brake release position, pump 1 delivers fluid through pipe 34, a throttle valve 35, a pipe 36 and normally open-center power steering device 15 to return pipe 9 which is connected with reservoir 10.

The flow resistance of these units produces a low delivery pressure of pump 1 which reaches inlet chamber 21 through pipe 22, acting upon large step 20 of stepped piston 19. This force acting on large step 20 overcomes the force of spring 33, displacing stepped piston 19 to the right so that passageway 31 is closed by closure member 32. The force of spring 29 is, however, greater than the force acting upon large step 20 so that the passage of a valve 37 formed by valve plate 27 and valve seat 30 remains closed.

Since fluid flow through brake booster 14 via a pipe 38 to reservoir 10 is inhibited when the brake is not applied, there is no flow of fluid through valve arrangement 16 either.

On brake application, throttle valve 35 is closed more or less so that pump 1 is required to deliver fluid against a greater resistance, thus developing a pressure.

Since, on brake application, a connection leading from pipe 24 of valve arrangement 16 to booster chamber 39 of brake booster 14 is opened, the fluid then pressurized to an increased pressure flows from pump 1 through pipe 22, inlet chamber 21, check valve 4, outlet chamber 25 and pipe 24 into booster chamber 39 of brake booster 14.

If in this instance the delivery pressure is so high as to overcome the force of spring 29 and force of the accumulator pressure acting on valve plate 27, valve plate 27 will be lifted off its valve seat 30 and accumulator 3 will be charged. Following termination of braking, throttle valve 35 is re-opened fully so that the pressure in the hydraulic system drops again to its previous low level. Valve 37 closes again, isolating accumulator 3, now charged, from the system.

If pump 1 fails, the accumulator pressure prevailing in pressure chamber 28 and acting on closure member 32 lifts closure member 32 off its valve seat, thus opening passageway 31 so that charged accumulator 3 is available for still further braking operations.

While I have described above the principles of my invention in connection with specific apparatus it is to be clearly understood that this description is made only by way of example and not as a limitation to the scope of my invention as set forth in the objects thereof and in the accompanying claims.

I claim:

1. A standby supply system for delivering pressure fluid to a user component comprising:
   a primary fluid source;
   a first check valve coupling the pressure fluid of said primary source to said user component;
   an accumulator;
   a second check valve coupling the pressure fluid of said primary source to said accumulator for charging thereof; and
   a valve arrangement coupled to said primary source, said accumulator and said user component, said valve arrangement being responsive to pressure from said primary source to control a connection from said accumulator to said user component;
   said valve arrangement including
   a housing having a longitudinal stepped bore accommodating a stepped piston slideable therein in an axial direction, an inlet chamber coupled to said primary source and an outlet chamber coupled to said user component, said piston having a front surface on its larger diameter portion exposed to pressure from said primary source in said inlet chamber and its smaller diameter portion projecting into said outlet chamber to control a passageway connecting said outlet chamber to said accumulator,
   the end of said passageway adjacent said outlet chamber being a valve seat and the end of said smaller diameter portion being a closing member for said valve seat,
   said inlet chamber being coupled to said outlet chamber by said first check valve, and
   said outlet chamber being coupled to said accumulator by said second check valve, said piston being biased in a direction to open said passageway.

2. A standby supply system according to claim 1, said bias including
   a first spring disposed between the step of said bore and the step of said piston to act on said piston in a direction to open said passageway.

3. A standby supply system according to claim 2, wherein
   said piston includes an axial channel therein having one end opening into said inlet channel axially and the other end opening into said outlet chamber radially, and
   said first check valve is disposed in said channel adjacent said one end thereof.

4. A standby supply system according to claim 3, wherein
   said passageway is provided in a valve plate disposed transversely of said housing and abutting against an annular valve seat formed in said housing, said valve plate and said annular valve seat comprising said second check valve, said valve plate separating said outlet chamber from a pressure chamber connected to said accumulator formed in an end of said housing remote from said inlet chamber, and said valve plate being kept in abutment with said annular valve seat by a second spring disposed in said pressure chamber.

5. A standby supply system according to claim 4, wherein
   the valve passageway of said valve plate and said annular valve seat has a large cross-sectional area to direct flow of pressure fluid from said outlet chamber to said accumulator through said pressure chamber.

6. A standby supply system according to claim 5, wherein
   the force of said second spring in the closing direction of said valve plate is greater than the force of the pressure in said inlet chamber acting on said larger diameter portion of said piston due to the flow resistance of said first check valve.

* * * * *